United States Patent Office 3,100,009
Patented Aug. 6, 1963

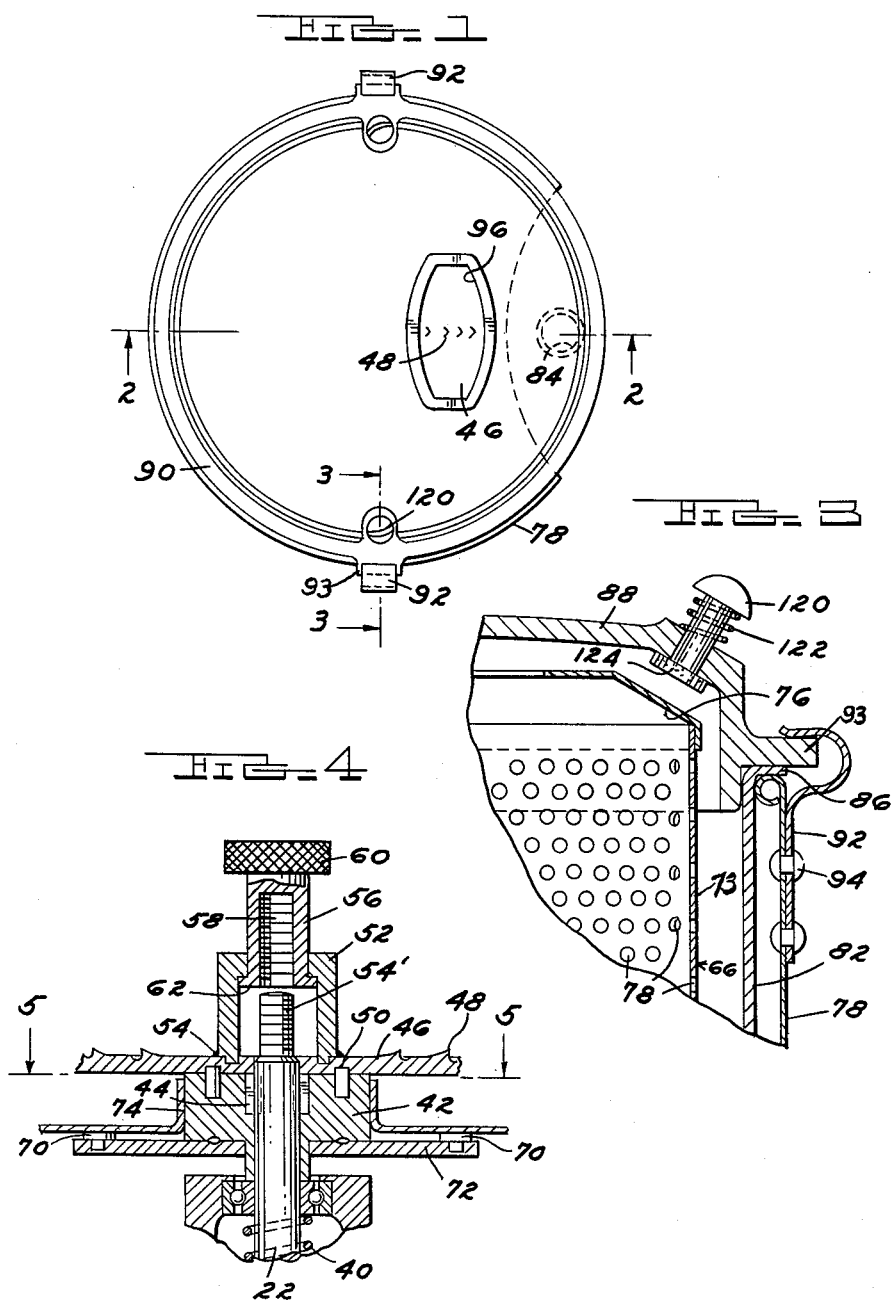

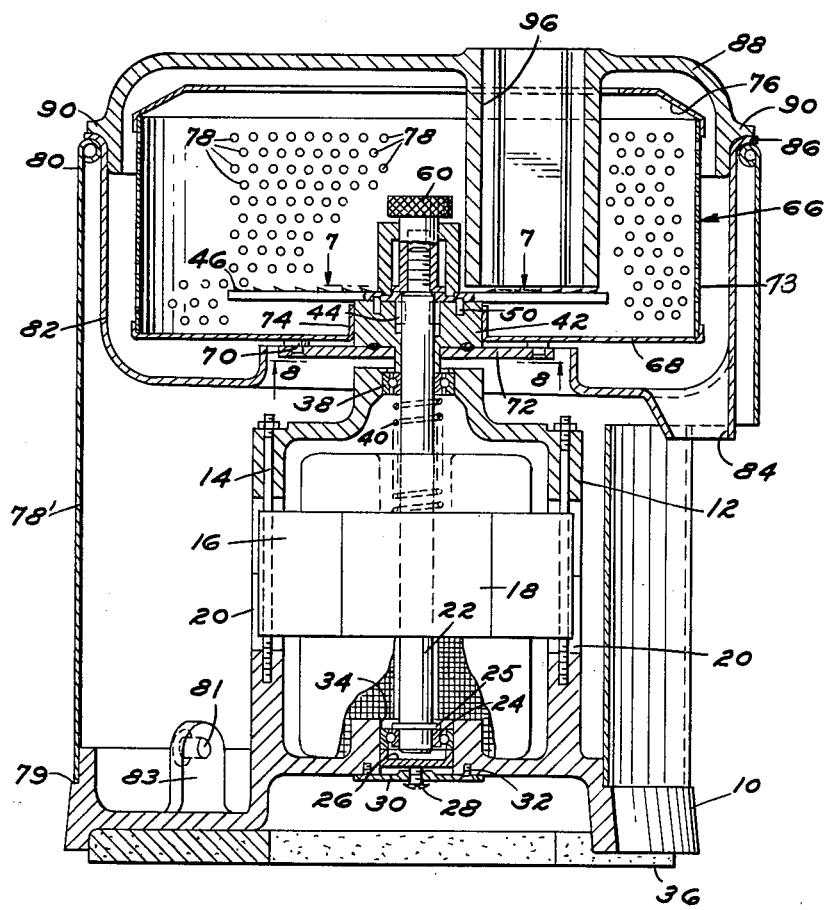

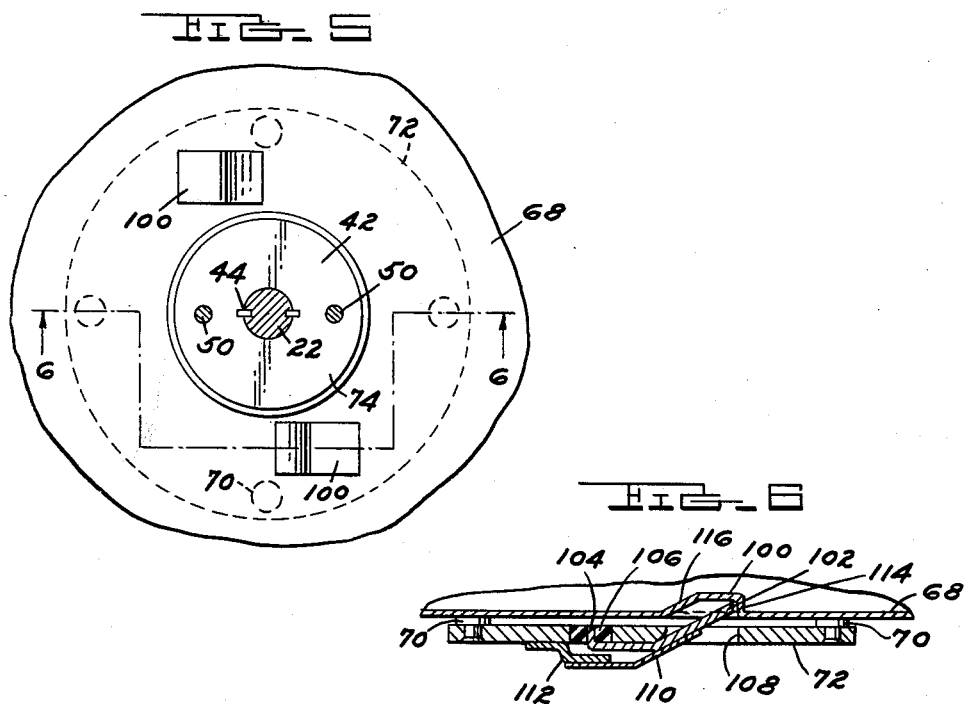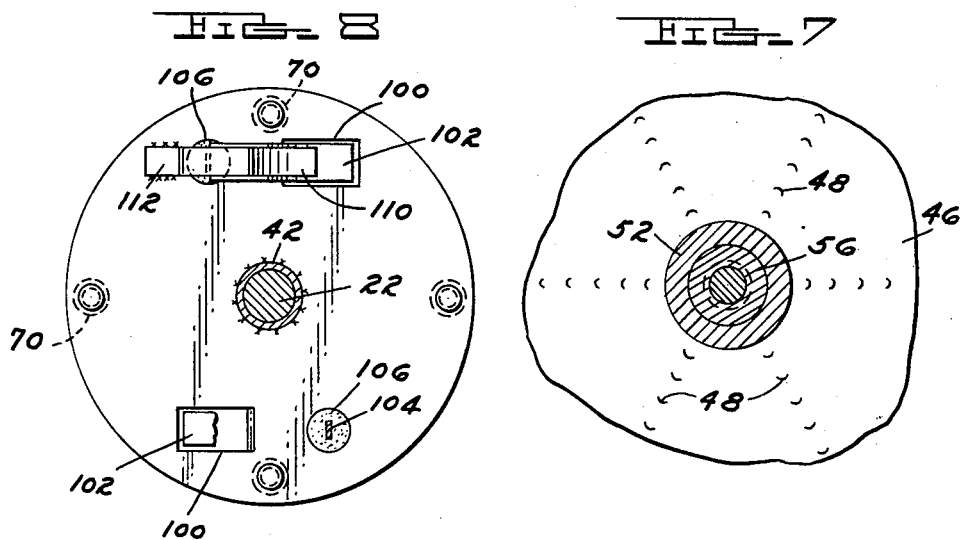

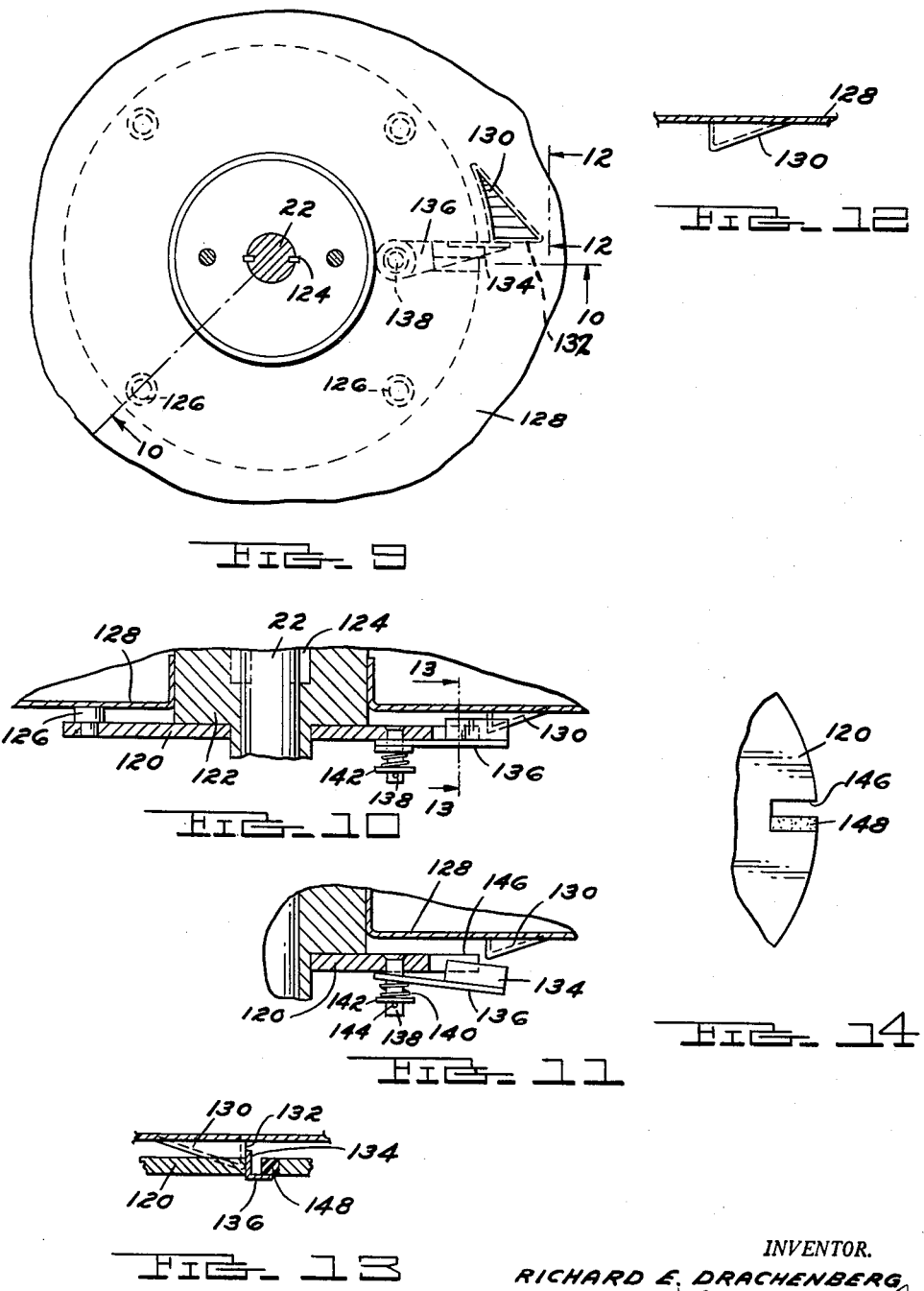

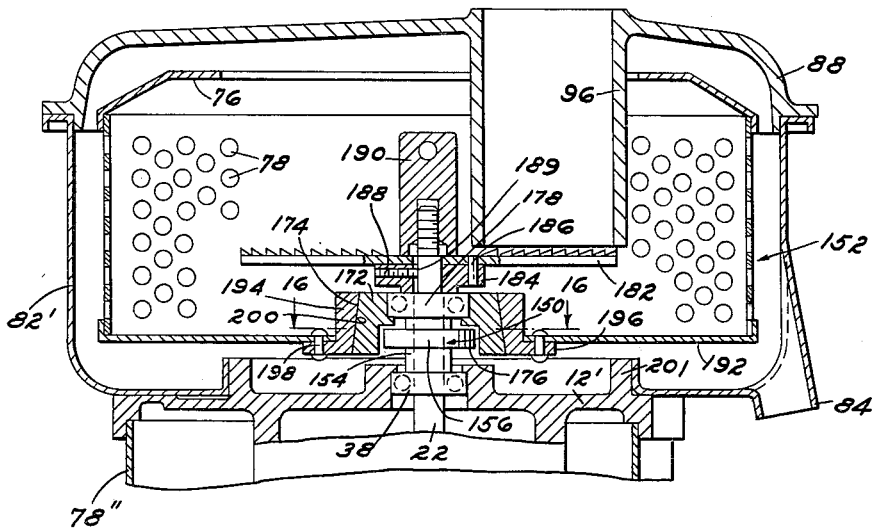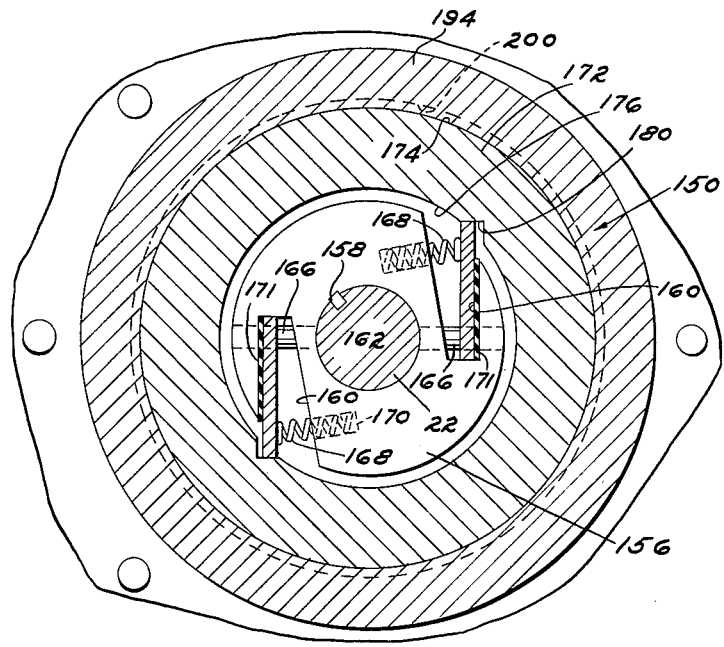

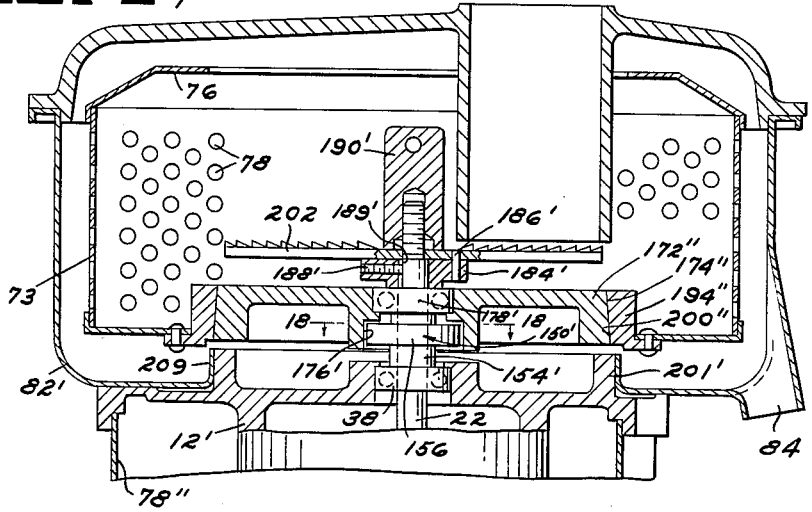

3,100,009
JUICE EXTRACTOR HAVING OVERRUNNING
SPINNER
Richard Edmund Drachenberg, 734 Westchester Road, Grosse Pointe Park, Mich.; Ruth P. Drachenberg, executrix of said Richard Edmund Drachenberg, deceased
Filed Dec. 30, 1960, Ser. No. 79,805
30 Claims. (Cl. 146—76)

This invention relates to an improved juicer mechanism for abrading or disintegrating materials such as vegetables and/or fruits and extracting the juice therefrom. The present application is a continuation-in-part of my copending application, Serial No. 16,986, filed March 23, 1960, now abandoned.

An object of the invention is to provide a mechanism of the character described which is of simple construction, relatively inexpensive to produce and efficient in operation, which is designed to quickly and thoroughly abrade or disintegrate vegetable matter to extract the juice therefrom, and is also easily cleaned after carrying out a juice extraction operation.

Another object is the provision of a juice extractor of the character hereinabove set forth which includes a cutter or abrader plate coupled with a drive shaft to be rotated thereby, this plate being provided with a cutting or vegetable disintegrating surface against which a vegetable may be urged to cause the flesh thereof to be shredded, pulped or torn to pieces. Combined with the plate is an encircling revolving, foraminous-walled spinner which is driven in a novel manner from the shaft. It collects the pulp and throws the juice through its foraminated wall into a surrounding collector basin from which the juice may be discharged into a container.

A novel characteristic of this construction is that while the disintegrating plate and the juice extracting spinner are both driven by the drive shaft of the mechanism, the spinner can overrun the cutting plate when such cutting plate is slowed up by a vegetable or the like being urged thereagainst. The spinner, therefore, may travel at a more effective rate of speed for extracting juice from the pulp.

Thus the spinner is releasably clutch-coupled with the drive shaft so that upon its overrunning of the spinner and drive shaft the spinner may be later rotatably picked up and driven by the shaft at a different relative position than it occupied when previously rotatably driven thereby. Such variation of position of the spinner relative to the drive shaft for rotatably driving prevents the build-up of pulp in the spinner at one place only and thereby tends to produce balanced rotation of the spinner, as well as more efficient juice extraction from the pulp.

Another object is the provision of a mechanism of the character herein set forth wherein the cutting or abrading plate, though rotatably driven by the drive shaft through being coupled positively therewith, may nevertheless be quickly detached therefrom for cleaning and for further disassembly of the machine. The spinner is also clutch-coupled with the drive shaft assembly for rotation thereby, but is likewise independently removable readily from such coupling engagement to permit its being cleaned.

A further object is the provision of a mechanism as herein set forth wherein a manually operable brake mechanism is provided adapted, upon discontinuance of the extraction operation, to be applied to stop the rotation of the mechanism without waiting for it to slow down through inertia.

Another object is the provision of a machine of the character described which is of light weight and relatively small size and presents an attractive, well-designed appearance and may be safely used without danger of injury to the user.

Yet another object is to provide a mechanism featuring a motor driven driving shaft and a spinner releasably clutch-coupled thereto to overrun in a phase of the juicing operation, in which various types of clutch arrangement are contemplated. Thus, in one embodiment the spinner is supported by a driving plate rotating with the shaft, which plate carries diametrically opposed, spring-urged pawls extending upwardly through accommodating apertures in the plate for releasable, overrun-permitting, driving engagement from beneath in recesses formed in a bottom wall of the spinner; another embodiment contemplates a different type of releasable pawl engagement of a member mounted on a driving plate with a different type of formation on the spinner; a further embodiment provides a driving disk or flange member secured to the motor shaft and carrying spring-urged pawls in recesses in the periphery thereof, which pawls have radially acting, releasable engagement with recesses in a mounting member for the spinner to permit the overrun; and a still further modified embodiment, in which a ball and ramp type clutch device is substituted for the pawl type, the balls thereof being considered as pawl elements is also provided.

In accordance with still another improved embodiment, the invention affords an improved mounting of the spinner upon a clutch-driven rotating member, in which mildly inclined cone surfaces on the spinner and the member in question are engaged in an axial direction. This provides an automatically self-centered mount of the spinner in relation to the shaft axis, and eliminates any vibratory effect tending to create noise in the operation of the mechanism.

In accordance with yet another object, the conical mating surfaces of the improved mount in question may optionally be of a diameter less than that of the cutter plate which overlies the same, so as to be brought inside of the annular cutting zone of the latter, or these mating surfaces may be of a diameter greater than that of the cutting plate, thus enabling the spinner to be lifted axially over the cutting plate for cleaning without entailing a prior removal of the plate itself.

In general, it is an object to provide a juicer having the overruning spinner attribute and advantage mentioned above, but in particular a juicer having a novel releasable supporting connection, between mating conical surfaces, of its hub and a concentric clutch-driven member which drives it; and still more specifically, a construction in which the diameter of the mating cone surfaces exceeds that of the cutting or abrading plate which is above them.

The foregoing as well as other objects will become more apparent as this description proceeds, especially when considered in connection with the accompanying drawings illustrating the invention, wherein:

FIG. 1 is a top plan view of my improved juice extractor;

FIG. 2 is a vertical cross section view taken on the line 2—2 of FIG. 1;

FIG. 3 is a fragmentary cross sectional view taken on line 3—3 of FIG. 1;

FIG. 4 is a fragmentary vertical sectional view taken on the same line as FIG. 2, but showing in larger scale the driving connections between the drive shaft, the cutter or abrader plate, and the spinner;

FIG. 5 is a fragmentary horizontal sectional view taken on the line 5—5 of FIG. 4, showing one form of overrunning clutch type driving plate of the mechanism;

FIG. 6 is a fragmentary vertical sectional view taken on broken line 6—6 of FIG. 5;

FIG. 7 is a fragmentary horizontal sectional view taken on the line 7—7 of FIG. 2;

FIG. 8 is a fragmentary horizontal sectional view taken on the line 8—8 of FIG. 2;

FIG. 9 is a fragmentary horizontal sectional view looking down on a rotating driving plate of the mechanism in a modified form of my invention;

FIG. 10 is a fragmentary sectional view taken on the broken line 10—10 of FIG. 9, showing the mechanism engaged for driving;

FIG. 11 is a fragmentary sectional view taken on a line similar to FIG. 10, showing the mechanism disengaged from driving;

FIG. 12 is a fragmentary sectional view taken on the line 12—12 of FIG. 9;

FIG. 13 is a fragmentary sectional view taken on the line 13—13 of FIG. 10;

FIG. 14 is a fragmentary plan view showing that portion of the driving plate provided with the cutout through which the clutch dog is moved;

FIG. 15 is a fragmentary view in vertical section similar to FIGS. 2 and 3, illustrating a further modified embodiment of the invention, in which mating conical surfaces are employed to mount the spinner coaxially of the shaft driven provisions of the mechanism;

FIG. 16 is a fragmentary view in enlarged scale and and horizontal section along line 16—16 of FIG. 15, also showing a further modified type of releasable clutch arrangement for the overrun of the spinner;

FIG. 17 is a fragmentary sectional view similar to FIG. 15, but showing the mating surfaces in question as being of a diameter greater than that of the cutting or abrading plate thereabove;

FIG. 18 is a view in horizontal section on line 18—18 of FIGS. 17 and 19.

FIG. 19 is a fragmentary view in vertical section centrally through the clutch provisions of FIGS. 17 and 18;

FIG. 20 is a fragmentary view in vertical cross section similar to FIGS. 16 and 17, illustrating a further modified type of clutch coupling of the mechanism; i.e., a ball and ramp type; and FIG. 21 is a view in horizontal section along line 21—21 of FIG. 20.

As shown in FIG 2 of the drawings, the improved juicer mechanism comprises a base or frame shell which consists of a lower portion 10 in the form of an aluminum casting or the like and an upper portion 12 which may be of the same material. These two portions are secured together by bolts or studs 14. Such studs are shown in FIG. 2 as extending downwardly through the upper portion 12 and into the lower portion 10, thus constituting a hollow frame which supports and encloses a drive motor, all as shown in FIG. 2.

The motor comprises a field or stator 16 and armature or rotor 18. The field 16 is supported upon the lower portion of the base 10 within cutouts 20 of the latter and is held in place by the studs 14. A motor shaft 22 upon which the armature 18 is fixedly mounted is supported at its lower end by a ball bearing 24, which bearing is mounted upon a cup-shaped disk or washer 26 held upwardly by an adjustment screw 28 that is adjustably threaded into a bottom plate 30. This plate 30 is secured to the base 10 by screws 32 as shown in FIG. 2. The shaft is shown as provided with a flange 25 which rests upon the inner race of the ball bearing 24, as shown in FIG. 2. The ball bearing 24 and cap-shaped element 26 are received within an aperture 34 which extends centrally through the lower base portion 10, as shown in FIG. 2. The base 10 likewise is illustrated as equipped with a cushion-like support plate 36 to avoid marring a supporting surface and to deaden whatever small vibration or sound that may attend the operation of the juicer. Cushion plate 36 may be formed of cork, rubber or the like.

The shaft 22 has fixed thereon an upper supporting ball bearing 38 which is mounted within a counterbored aperture formed in the upper portion of the frame shell portion 12 surrounding the shaft. An expansion spring 40 is axially interposed between the inner race of this ball bearing and the armature 18 mounted on the shaft, as shown in FIG. 2. The upper end portion of the shaft 22 extends beyond the base or frame shell portion 12 and is fitted thereabove with an assembly of parts, hereinafter described, which includes the driving connections between the cutter plate and the porous spinner of the mechanism and the drive shaft.

A hub 42 is mounted upon this upper end portion of the drive shaft as shown in FIGS. 2, 4, and 5. This hub is removably mounted upon the shaft, as by being keyed thereto through the use of keys 44. The cutter or abrader plate designated 46, is provided with cutter points 48 and is detachably secured by pins 50 to the hub to rotate therewith. These pins are seated within openings provided in the hub, and the under side of the cutter plate 46 is provided with recesses to removably receive the upper ends of the pins.

A cup-shaped nut retainer 52 for the cutter plate is shown as attached to the cutter plate 46, as by being welded or otherwise fixed thereto at 54. The upper end of the drive shaft 22 projects above the cutter plate into this retainer, being screw threaded at 54' at the shaft top. A cutter plate hold-down nut 56, internally screw threaded at 58 and provided with a knurled hand grip portion 60, is adapted to be threaded onto the top end of the shaft, as shown in FIGS. 2 and 4, thus to hold the cutter plate down upon the hub 42. It is also adapted to be unthreaded therefrom as shown in FIG. 4, and, in order that when it is so unthreaded it may be lifted up along with the cutter plate for removal of the latter, this hold-down nut has a flange portion 62 at its lower end which engages upwardly against the nut retainer 52.

A foraminated cylindrical spinner 66 is provided as shown in FIGS. 2 and 3, this spinner having a bottom wall portion 68 that rests upon supporting pins or buttons 70 carried by a spinner supporting plate 72, which pins or buttons may be formed of nylon or other suitable material. The plate 72 is welded or otherwise fixed to the bottom of the hub 42 to rotate therewith.

The bottom wall 68 of the spinner, characterized by a cylindrical foraminated side wall 73, is thus freely frictional supported on the pins 70 but is otherwise disconnectably coupled with the spinner supporting plate 72 to be rotatably driven thereby, as hereinafter set forth. The bottom wall has an upright flange portion 74 which has a close slip fit around the hub 42, as shown in FIGS. 2 and 4, and the spinner also has an upwardly and inwardly directed, overhanging and removable cover plate or flange 76, as shown in FIGS. 2 and 3. These figures also show the foraminations 78 in the side wall 73.

The mechanism heretofore described is entirely enclosed within a side wall or shroud, indicated as a cylindrical side wall portion 78', best shown in FIG. 2. This side wall portion rests upon a shoulder 79 formed on the base 10 and is held thereon by screws 81 carried by lugs 83. The upper margin of the shroud 78' is rolled over as at 80 to form a bead for the support of a juice containing collector basin 82, which basin is supported upon the bead as shown particularly in FIGS. 2 and 3.

This juice collector basin 82 surrounds the spinner 66 and is itself provided with a discharge outlet spout 84 through which extracted juice may be discharged into a suitable juice receiving vessel not shown. The upper margin of this juice collector basin 82 is flanged outwardly at 86 to overhang the bead 80 of the shroud 78' for support thereby.

A cover plate 88 which may be formed of a suitable lightweight casting or any suitable material is provided, as also shown in FIGS. 2 and 3. This cover plate has an outwardly radially projecting flange 90 that seats upon the flange 86 of the collector basin 82. Such cover plate may be held down by spring elements 92 secured, as by rivets 94 or the like, to the shroud 78', as also shown in FIG. 1. The spring elements 92 are releasably engageable with integral radially projecting ears 93 on the flange 90.

The cover plate is provided with a tubular material inlet 96, through which a vegetable to be shredded may be urged downwardly against cutter plate 46. In order to facilitate the urging of the complete vegetable through the inlet 36, a wooden plunger or the like, as shown in my prior Patent No. 2,273,093 of February 17, 1942, may be provided to hold the same down against the cutter plate.

The spinner 66 is driven from the spinner supporting and driving plate 72 by a detachable connection formed between the plate and the bottom wall 68 of the spinner. As shown in FIGS. 5, 6, 7 and 8, the bottom wall 68 is provided with upwardly extending, diametrically opposed recesses or indentations 100 which are adapted to removably receive pawl elements 102, shaped as shown in FIG. 6, in the overrunning phase of the operation. The inner end 104 of each pawl element is fixedly received within a supporting washer 106 carried by plate 72 to rotate therewith. This washer 106, which may be formed of a suitable resilient material such as rubber, neoprene or the like, is fixedly inserted within an aperture formed in the plate 72 and filled by the washer.

An outer upwardly angled projecting end of the pawl 102 extends through an aperture 108 formed in the driving plate 72, and at this end the pawl is urged upwardly by a leaf type pawl spring 110 fixedly carried by a pawl retainer 112. This retainer is secured to the under side of the spinner supporting and driving plate 72 by being welded or otherwise fixed thereto. As indicated, there are two of the recesses 100 formed in the bottom of the spinner and disposed diametrically opposite each other and two similarly disposed pawl accommodating recesses in plate 72, as shown in FIGS. 5 and 6.

It will be seen that the outer end of each pawl 102 is adapted to engage against an upright wall 114 of a detent recess 100 formed in the bottom of the spinner, thus to drive the spinner as the plate 72 is driven. The wall portion opposite the upright wall 114 of the recess 100 is sloping at 116, and it is apparent, therefore, that if the rotation of the spinner driving plate 72 is slowed up, as would result upon an adequate pressure from a vegetable being held against the cutter plate for cutting thereby, it will also slow up the rotation of the spinner supporting plate 72. However, the spinner 66 itself, due to its rotative momentum, can overrun such plate, and the end portion 102 of the pawl will be readily overridden by the sloping wall 116 of the recess in the spinner bottom. This overrunning would continue until the motor and cutting plate have resumed speed sufficiently for the rotating pawl 102 to again engage with a recess 100 of the bottom wall and to drive against upper wall 114 of such recess, thus to pick up the spinner and carry it about with the driving and supporting plate 72.

It is likewise apparent that since there are two of these pawls and two recesses in the bottom of the spinner to receive the pawls that the spinner might be picked up at either one of two positions. This is an advantage in that it will be apparent that if the spinner and the cutter plate are rotating in unison at one relative position only, the disintegrated vegetable material that is thrown off from the cutter plate would tend to pile up at one point only on the spinner side wall, and that the spinner would become unbalanced in its rotation. However, due to the spinner being permitted to overrun the cutter plate, the material being thrown out impinges a changing surface of the cylindrical spinner wall 73, and when the spinner 66 is again picked up for rotation after such overrunning, its relative position with respect to the cutter plate may have changed so that the maximum amount of material thrown off by the cutter plate would now pile up against another part of the spinner side wall 73. This other part of the spinner side wall might be diametrically opposite from the portion on which the disintegrated material had first been thrown. This permitted overrunning and relative displacement rotatably of the spinner with respect to the cutter plate is therefore a meritorious and advantageous feature of the invention.

FIG. 3 shows a manual brake device on cover 88 to slow down and halt the spinner rotation when desired, in the form of a plunger 120 which is held upwardly by a coil spring 122. Opposite the head of plunger 120 the latter carries a brake plate or friction element 124. When the plunger 120 is pushed inwardly, friction element 124 engages a flange 76 of the spinner and slows up the rotation of the spinner. This, of course, also slows up the rotation of the drive shaft assembly, hence braking should be done when the motor is de-energized so as to arrest its rotation more quickly than it would if it slowed up solely through inertia.

It is apparent that suitable conventional electrical cord connection may be provided to connect the motor with an electrical outlet.

It is also apparent that, when it is desired to clean the device following use, the cover 88 may be lifted off by shifting it rotatively a bit to release it from the spring hold-down elements 92. The cutter plate 46 may then be removed by unthreaded the hold-down screw 60 to the position shown in FIG. 4 and then lifting such hold-down screw, cutter plate screw retainer, and cutter plate itself from the end of the shaft. The cutter plate will lift off the drive pins 50. The spinner 66 may then be lifted off the hub 42 and the spinner driving and supporting plate 72. This spinner supporting plate 72, together with the hub 42 to which it is welded, may then be lifted from the shaft extension, so that all of the parts requiring cleaning may be readily cleaned and then re-placed in suitable driving relationship upon the upper end of shaft 22.

FIGS. 9-14 represent a modified form of the invention as compared with the construction shown in the first eight figures of the drawings. The modification relates only to the driving connection between the rotatably driven plate 72 shown in the first eight figures of the drawings and the spinner 66 shown therein. In the modification shown in FIGS. 9-14, the plate is designated 120 and is secured to the hub 122, which in turn is secured to the shaft 22 by keys 124, as shown in FIG. 9, and in this respect the structure is similar to the modification of FIGS. 1-8.

The plate 120 is provided with supporting pins or buttons 126, which correspond to the pins 70 of FIG. 4 and upon which the spinner, here designated 128, rests. The spinner 128 is of the same general construction as the spinner 66 in the first modification but is shown as having a detent formation 130 offset downwardly of the bottom wall of the spinner. This formation slopes in two directions, as shown in FIGS. 9-13, so that it presents a flat side 132 against which a flat upright wall 134 of a driving dog 136 may engage to drive the spinner.

The dog 136 is supported upon a pin 138 (FIGS. 10 and 11), which pin is welded to the plate 120, and is held upwardly by a light coil spring 140, a washer 142 supporting the spring. A cotter pin 144 extends through the pin to hold the washer. The dog 134, under its own weight, normally drops slightly downwardly, as shown in FIG. 11, but it is adapted to be lifted upwardly and outwardly by centrifugal force and the spring, when the revolving plate 120 picks up speed of rotation.

The plate 120 has a cutout 146 extending therethrough at its periphery, as shown in FIGS. 11, 13 and 14, and a rubber bumper 148 is secured to one side of this cutout. The spring 140 normally holds the dog 134 upwardly in the cutout to rotate with the revolving plate 120, and centrifugal force lifts the dog so that it engages the flat side of the detent 130 when the plate revolves in a counterclockwise direction so as to rotate the spinner 128.

As heretofore described in connection with the first modification, when the spinner overruns the revolving plate, the flat side of the detent formation 130 leaves the driving dog and goes ahead and the beveled side of the detent is adapted to ride over the dog so long as the spinner continues to overrun the revolving plate. When the revolving plate again picks up its speed so that it can drive the spinner, the dog will again pick up the flat side of the detent.

It is understood that, as shown in FIG. 5 of the first modification, the instant modification illustrated in FIG. 9 might be provided with two detents for the same purpose as set forth in the description of FIGS. 1–8.

FIGS. 15 and 16 show a further modified embodiment of the invention, differing from those described in respect to the releasable overrunning clutch provisions and the provisions for mounting the spinner for rotation. Parts featuring this embodiment which correspond to parts previously described will be designated by corresponding reference numerals, and further description thereof will be dispensed with.

Thus, the motor shaft 22 is shown as being provided, above the bearing 38 and motor housing portion 12, with a clutch, generally designated 150, which permits the overrun of the spinner, here designated 152, the clutch 150 being spaced axially upwardly of the inner race of bearing 38 by a collar 154 which rests on the inner race. Details of clutch 150 are shown in FIG. 16, as well as in FIGS. 18 and 19, to a still further embodiment not differing from the forms of FIGS. 15 and 16 in regard to clutch structure.

This clutch differs from those previously described, in that releasable clutching action takes place in the radial direction. To this end, clutch 150 comprises a disk 156 keyed at 158 to shaft 22 for rotation therewith. The disk is provided with two diametrically opposed notches or recesses 160 extending thereunto from the periphery thereof, the notches being of a quasi-V shaped outline. Each notch movably receives a clutch pawl 162 in the form of a plate element having a top outward flange 164 (FIG. 19) adapted to rest upon and be guided by the top surface of the disk outwardly thereof. At its inner end, each pawl plate 162 is slidably guided, with appropriate clearance for freedom of action, by a radially extending pin 166 carried by the plate and extending through the inner portion of the recess 160. A small coil spring 168 seated in a recess 170 in the disk acts outwardly against the pawl plate to urge the same radially for clutching action to drive the spinner 152, a cushion pad 171 deadening noise.

For coaction with the above described clutch disk and pawl structure, a clutch ratchet member 172 is provided. Member 172 is of annular outline in a substantially thick axial dimension, provided with a radially inwardly and upwardly tapered, conical outer peripheral surface 174, for the purposes presently to be described. It is counter-bored from beneath at 176 to receive pawl-carrying disk 156 from beneath, and it is counterbored at its top to receive a ball bearing 178, the inner race of which is fast on shaft 22 and the outer race of which has a press fit in the last-named counterbore of ratchet member 72. Again referring to FIG. 16, the counterbore 156 is formed to provide a pair of diametrically opposed ratchet recesses 180, into which the pawl plates 162 are urged by springs 168. At the momentum of the spinner 152, as secured to the ratchet member 172 in the improved fashion to be described, carries the same ahead of the cutting plate, here designated 182, the pawl plates 162 ride out of the recesses 180, then return into the latter when the spinning speed decreases to couple the clutch disk 156 and pawl plates overtaking the same.

The cutting plate 182 in this instance rests upon the flanged collar 184, being locked to the latter for rotation therewith by one or more pins 186; and the collar 184 is in turn locked to shaft 22 for rotation by the latter through the agency of a set screw 188 engaging against a flattened surface 189 of the shaft. A nut member 190 threaded on the top of the shaft engages downwardly upon plate 182 to releasably hold the same in place.

In further accordance with the improvement of FIGS. 15 and 16, the bottom wall 192 of spinner 152 is provided with a central aperture of substantial size which fits downwardly over a spinner drive hub 194, resting upon a radially outwardly extending bottom flange 196 of the latter and being fixedly secured thereto, as by rivets 198. Hub member 194 is provided with a conical surface 200 mating with the outer peripheral conical surface 174 of the ratchet member 172 of clutch 150. The diameter of this conical surface is substantially less than that of the cutting plate 182, so that they are disposed radially inwardly of the actual cutting zone of the plate 182 and shielded therebeneath. However, the mating conical surfaces 174, 200 provide a highly improved mount for the spinner 192, in that it is automatically self centering perfectly when its hub 194 is dropped onto the ratchet member 172. Dynamic balance is maintained in rotation, and vibratory effects, with resulting objectionable noise in operation, are eliminated. The cone angle is about 2°.

It is to be noted that the embodiment of FIGS. 15 and 16, and also those of 17–19 and 20 and 21 differ from the forms of FIGS. 1 through 14, in respect to the relationship of the shroud, specially designated 78″ and the juice collector basin, specially designated 82′, to the upper portion 12′ of the motor and shaft-mounting shell or frame of the mechanism. That is, the collector basin 82′ telescopes over an annular upstanding shoulder 201 integral with the portion 12′, and the cylindrical wall of shroud 78″ is reduced in diameter, as compared with the embodiment of FIG. 2, being received upwardly within an annular outer depending flange integral with the portion 12′. Thus, the collector basin 82′ is given a stable support upon the frame of the mechanism, and the shroud 78″ is compactly locked to the frame. The overall lateral dimension of the mechanism as a whole is reduced.

It is also to be understood that the modified embodiments illustrated in FIGS. 15 through 21 may incorporate brake provisions for slowing the rotation of the spinner, of the type illustrated in FIG. 3 of the drawings.

The embodiment of FIGS. 17, 18 and 19 is similar in practically all respects to that of FIGS. 15 and 16, so that corresponding reference numerals, primed, are employed to designate corresponding parts. The form of FIGS. 17, 18 and 19 differs in that the diameter of the mating conical surfaces on the ratchet member 172″ and the spinner hub 194″ are increased sufficiently to exceed the diameter of the cutting plate, here designated 202. This enables the spinner and its hub to be lifted upwardly for cleaning past the cutting plate 202 without first removing the same, then readily and quickly replaced after cleaning or removal of pulp.

In other respects the operation of the embodiment of FIGS. 17, 18 and 19 is identical to that of FIGS. 15 and 16.

Referring to FIG. 17, note should also be taken that the annular upturned flange 209 of the juice collector basin 82′ which telescopes over the annular upturned shoulder 201′ of frame 12′ is of greater internal diameter than the cone-surfaced ratchet member 172′, hence also of substantially greater diameter than the cutting plate 202. Thus, not only may the spinner hub 194′ be lifted freely over the cutting plate for cleaning, the collector basin 82′ may be similarly removed, without disturbing the cutting plate 202; and the parts in question may be cleaned and replaced without unscrewing the nut member 190′ which holds down the cutting plate. Actually, the latter need not be removed at any time. By pouring a half glass of water over the same after juicing is done, the cutting plate is adequately cleansed without removal.

FIGS. 20 and 21 illustrate a still further modified adaption of the principle of the invention, in which a ball type of pawl is employed for the overrunning connection between the spinner and the shaft 22. Since, in respects other than the type of clutch the embodiment of FIGS. 20 and 21 resembles those of FIGS. 15 through 19, and in particular FIG. 17, parts corresponding to those appearing in said figures are designated by corresponding reference numerals, primed.

The ball type clutch is generally designated by the reference numeral 208. As best shown in FIG. 21, it comprises a disk 210 resting upon the spacer collar 154' and secured for rotation, as by a key 212, with the shaft 22. The disk 210 is formed about its outer periphery to provide a number of angled ramp recesses, defined by wedging surfaces 214 at an angle to a radius of the disk and stop surfaces 216. A clutch ball 218 is disposed in each of the recesses, shown as three in number in this embodiment, and is adapted to wedge between the surface 214 and the counterbore 176' of a driven member 220 corresponding in function to the cone type ratchet member 172' of the embodiment shown in FIG. 17, thus to drive said member, and the spinner hub member 194" resting thereon at its conical surface 174", when the shaft 22 drives clutch disk 210 counterclockwise, as viewed in FIG. 21. When the shaft drive is opposite, the balls 218 retreat inwardly against the respective stop surfaces 216, freeing the member 220 for overrunning rotation relative to clutch disk 210 and the motor shaft. As shown in FIG. 20, a washer 222 of relative large diameter is interposed between clutch disk 210 and the spacer collar 154, upon which the clutch balls 218 ride.

The ball and ramp type of clutch shown in FIGS. 20 and 21, of course, serves the function of the plate type of pawl member utilized in the embodiments of FIGS. 1 through 19. However, it declutches without a clicking sound, and its three point engagement assists in keeping the spinner (not shown), as mounted to the member 220 by a spinner hub 200", centered well at all times. Thus, whereas the two-pawl and ratchet designs of FIGS. 1 through 19 have the advantage, in engaging at 180° spaced locations, with the law of average giving an even chance of engagement in one position as in the other to minimize unbalance, if the two pawls do not engage instantaneously and evenly, then the thrust is in the main on one side, tending to cant the spinner from a true running position. However, the three point ball pawl engagement of the embodiment of FIGS. 20 and 21 eliminates this possibility, and affords a smooth, click free engagement and disengagement of the balls 218 for their wedging-type drive. Centrifugal force will normally throw the balls in a direction for wedging engagement between the ramp surfaces 214 and the bore 176. However, in order to insure maintenance of such engagement for instantaneous action when the clutch disk 210 is to drive the clutch, I preferably provide coil springs 224 (see FIG. 21) seated in recesses in the stop surfaces 216 and urging the balls outwardly.

It is seen that the invention affords numerous embodiments of a juicing mechanism, all characterized by an overrunning action of the spinner when the speed of rotation of a positively driven abrading plate is retarded in pulping a vegetable. In the overrun, the zone at which the pulp is thrown outwardly against the cylindrical spinner wall is varied, with better extraction of juice; and upon resumption of driving engagement it is likely that a different clutch point will come into play, in the embodiments of FIGS. 1 through 19, than previously. As for the embodiment of FIGS. 20 and 21, there are infinite possibilities in regard to the angular relationship of the spinner to the clutch upon resumption of drive. The constructions as particularly shown in FIGS. 15 through 21 contribute greatly to ease of removal of parts for cleaning, and in particular the mating cone type of mount of the spinner on its driving member insures accurate centering and noise-free operation.

What I claim as my invention is:

1. A juicer having an upright rotatably driven shaft member, a cutter plate coupled with the shaft member to be rotatably driven positively thereby, a foraminated spinner member surrounding the cutter plate to collect distintegrated material thrown off thereby, and means to releasably couple said spinner member with the shaft member to be rotatably driven thereby positively at a speed no less than that of the shaft member and so coupled therewith as to permit the spinner member to rotatably overrun the shaft member when the rotation of the cutter plate is slowed up below the rotatable momentum of the spinner member.

2. A juicer as defined in claim 1 characterized in that the releasable coupling means between the shaft member and the spinner member may pick up the latter at any one of at least two relative positions of rotation of the spinner member with respect to the shaft member.

3. A juicer as defined in claim 1 characterized in that the releasable coupling means between the shaft member and the spinner member may pick up the latter at any one of at least two relative positions of rotation of the spinner member with respect to the shaft member, said driving connection comprising an overrunning clutch having at least two pawl elements mounted for relative movement on one of said members and carried for rotation therewith, the other member having at least a corresponding number of drive formations optionally engageable releasably by said pawl elements to provide said releasable coupling of the members.

4. A juicer as defined in claim 1 characterized in that the releasable coupling means between the shaft member and the spinner member may pick up the latter at any one of at least two relative positions of rotation of the spinner member with respect to the shaft member, said driving connection comprising an overrunning clutch having at least two rolling elements mounted for relative movement on one of said members and carried for rotation therewith, the other member having a cylindrical surface engageable releasably and wedgingly by said rolling elements to provide said releasable coupling of the members.

5. A juicer as defined in claim 1, characterized in having a hub part secured to the shaft member to rotate therewith, the cutter plate being mounted upon and detachably secured to the hub part to rotate therewih, a cup-shaped nut retainer secured to and above the cutter plate coaxially of the latter, and a hold-down nut extending through the top of the nut retainer and provided at its lower end with an outwardly projecting flange disposed within the nut retainer, said nut being removably adjustably threaded upon the shaft member to hold the cutter plate down against the hub and to permit release therefrom.

6. A juicer as defined in claim 2, further characterized in having a hub part secured to the shaft member to rotate therewith, the cutter plate being mounted upon and detachably secured to the hub part to rotate therewith, a cup-shaped nut retainer secured to and above the cutter plate coaxially of the latter, and a hold-down nut extending through the top of the nut retainer and provided at its lower end with an outwardly projecting flange disposed within the nut retainer, said nut being removably adjustably threaded upon the shaft member to hold the cutter plate down against the hub and to permit release therefrom.

7. A juicer having an upright rotatably driven shaft, a cutter plate coupled with the shaft to be rotated thereby, a foraminated spinner surrounding the cutter plate to receive distintegrated material therefrom, overrunning clutch means coupling said spinner with the shaft to be rotated thereby, means including a removable cover providing a collector basin surrounding the spinner to receive juice therefrom, and brake means mounted upon said cover of said basin means to apply braking action against the spinner to retard its rotation.

8. A juicer as defined in claim 7, characterized in that said brake means is operably supported upon the cover and manually shiftable relative thereto to act upon the spinner to apply braking action to the latter.

9. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about said axis, comprising a hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member.

10. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about said axis, comprising an annular hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member, said mounting surface being of greater internal diameter than said cutting plate for upward release from said driving member past said cutting plate.

11. A juicer comprising a rotative motor driven shaft member having an upright axis, a spinner member mounted for rotation about said axis, a cutting plate within said spinner having an annular cutting zone and positively connected to said shaft member for rotation, and means providing an overrunning clutch connection to positively rotate said spinner member from said shaft member about said axis, comprising an annular hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member, said mounting surface being of smaller internal diameter than said cutting zone of said cutting plate.

12. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about said axis, comprising a hub member on said spinner member coaxially of said axis, said hub member being disposed beneath said cutting plate and provided with an annular, axially tapered mounting surface, a driving member coaxially surrounding and rotatable with said shaft mmeber, the driving member being provided with an axially tapered surface releasably engageable and mating with said mounting surface of the hub member to rotate the latter from said driving member, said clutch connection comprising coacting overrunning clutch elements rotatable respectively with said shaft and driving members to permit overrun of said driving, hub and spinner members relative to said shaft member upon retardation of the rotative speed of the latter.

13. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about said axis, comprising a hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member, said clutch connection comprising coacting overrunning clutch elements carried respectively by said shaft and driving members to permit overrun of said driving, hub and spinner members relative to said shaft member upon retardation of the rotative speed of the latter, said clutch elements including at least one radially acting pawl element mounted to said shaft member for rotation therewith and movement relative thereto, and at least a corresponding number of ratchet formations on said driving member with which said pawl element has releasable engagement upon said relative movement thereof.

14. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about said axis, comprising a hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member, said mounting surface being of greater diameter than said cutting plate for upward release from said driving member past said cutting plate, said clutch connection comprising coacting overrunning clutch elements carried respectively by said shaft and driving members to permit overrun of said driving, hub and spinner members relative to said shaft member upon retardation of the rotative speed of the latter, said clutch elements, including at least one radially acting pawl element mounted to said shaft member for rotation therewith and movement relative thereto, and at least a corresponding number of ratchet formations on said driving member with which said pawl element has releasable engagement upon said relative movement thereof.

15. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about said axis, comprising a hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member, said clutch connection including at least one rolling element carried by said shaft member for rotation therewith, said driving member having a cylindrical surface engageable by said element to drive the driving, hub and spinner members.

16. A juicer comprising a rotative motor driven shaft member having an upright axis, a spinner member mounted for rotation about said axis, a cutting plate within said spinner positively connected to said shaft member for rotation, and means providing an overrunning clutch connection to positively rotate said spinner member from said shaft member about asid axis, comprising a hub member on said spinner member coaxially of said axis, said hub member being disposed beneath said cutting plate and provided with an annular, axially tapered mounting surface, a driving member coaxially surrounding and rotatable with said shaft member, the driving member being provided with an axially tapered surface releasably engageable and mating with said mounting surface of the hub member to rotate the latter from said driving member, said mounting surface being of greater diameter than said cutting zone of said cutting plate for upward release from said driving member past said cutting plate, said clutch connection including at least one rolling element carried by said shaft member for rotation therewith, said driving member having a cylindrical surface engageable by said element to drive the driving, hub and spinner members.

17. A juicer in accordance with claim 2, in which said releasable coupling means comprises at least two pawl elements carried by said shaft member for rotation therewith and for movement relative thereto, said spinner member having drive formations releasably engageable from beneath by said pawl elements in said rotation and relative movement of the latter.

18. A juicer comprising a rotative motor driven shaft member having an upright axis, a spinner member mounted for rotation about said axis, a cutting plate within said spinner positively connected to said shaft member for rotation, and means to rotate said spinner member from said shaft member about said axis, comprising an annular hub member on said spinner member coaxially of said axis, said hub member being disposed beneath said cutting plate and a driving member coaxially surrounding and rotatable with said shaft member, said hub member being of greater internal diameter than said cutting plate for upward release from said driving member past said cutting plate, said driving member drivingly engaging said hub member to rotate the spinner member.

19. A juicer comprising a rotative motor driven shaft member having an upright axis, a spinner member mounted for rotation about said axis, a cutting plate within said spinner positively connected to said shaft member for rotation by the latter, and means providing a positive overrunning clutch connection to rotate said spinner member from said shaft member about said axis, comprising an annular hub member on said spinner member coaxially of said axis, said hub member being disposed beneath said cutting plate and a driving member coaxially surrounding and rotatable with said shaft member, said hub member being of greater internal diameter than said cutting plate for upward release from said driving member past said cutting plate, said driving member drivingly engaging said hub member at the internal diameter, thereof to rotate the spinner member.

20. A juicer having an upright rotatably driven shaft, a cutter plate coupled with the shaft to be rotatably driven thereby, a foraminated spinner surrounding the cutter plate to collect disintegrated material thrown off thereby, means positively and releasably coupling said spinner with the shaft to be rotatably driven positively thereof and to rotatably overrun the shaft when the rotation of the cutter plate is retarded, and a collector basin surrounding the spinner.

21. A juicer provided with an upright rotatably driven shaft, a cutter plate releasably coupled with the shaft to be rotatably driven thereby or for disconnection therefrom, a foraminated spinner surrounding the cutter plate to receive disintegrated material thrown off thereby, means positively and releasably coupling said spinner with the shaft to be rotated positively thereby, said connection between the spinner and the shaft permitting the spinner to overrun the shaft when the speed of rotation of the shaft is retarded, said connection automatically operable to cause the shaft to pick up the spinner for positive rotation thereby when the speed of rotation of the shaft exceeds the rotatable momentum speed of the spinner, and a collector basin surrounding the spinner to receive juice distracted therefrom.

22. A juicer as defined in claim 21 characterized in that the driving connection between the shaft and the spinner includes plural means to pick up the spinner at any one of at least two relative positions of the spinner with respect to the shaft.

23. A juicer provided with an upright rotatably driven shaft, a cutter plate releasably coupled with the shaft to be rotatably driven thereby or for disconnection therefrom, a spinner support coupled with the shaft to rotate therewith, a foraminated spinner surrounding the cutter plate to receive disintegrated material therefrom, said spinner being mounted on the spinner support to rotate therewith, said spinner and spinner support each being provided with cooperating driving means operable at circumferentially spaced points thereon to positively and releasably couple the spinner with the spinner support to rotate therewith while permitting the spinner to rotatably overrun the spinner support when the speed of rotatable momentum of the spinner exceeds the shaft driven speed of the spinner support, and a collector basin surrounding the spinner to receive juice extracted from the spinner.

24. A juicer comprising a motor-driven shaft, a rotative macerator plate having means rigidly connecting the same to said shaft for a positive drive thereby, a foraminated annular spinner disposed coaxially of said shaft and macerator plate in peripheral surrounding relation to the latter to confine vegetable or like matter macerated by and centrifugally thrown from the plate, a member coaxial with said shaft having clutch means providing for a positive, one-way overrunning drive of said member from said shaft, and means connecting said spinner to said member for a corresponding positive and overrunning drive of the spinner from the shaft at a speed no less than that of the shaft, said clutch means enabling said member and spinner to unidirectionally overrun the shaft and macerator plate upon predetermined retardation of the rotation of said plate and shaft.

25. A juicer comprising a motor-driven shaft, a rotative macerator plate having means rigidly connecting the same to said shaft for a positive drive thereby, a foraminated annular spinner disposed coaxially of said shaft and macerator plate in peripheral surrounding relation to the latter to confine vegetable or like matter macerated by and centrifugally thrown from the plate, a member coaxial with said shaft having clutch means providing for a positive, one-way overrunning drive of said member from said shaft, and means connecting said spinner to said member for a corresponding positive and overrunning drive of the spinner from the shaft at a speed no less than that of the shaft, said clutch means enabling said member and spinner to unidirectionally overrun the shaft and macerator plate upon predetermined retardation of the rotation of said plate and shaft, said last named connecting means comprising mating annular frusto-conical surfaces on said member and spinner in a releasable frictional engagement with one another for the drive of the spinner from the member, yet permitting separation of said spinner from said member upon relative axial movement thereof.

26. A juicer comprising a motor-driven shaft, a rotative macerator plate having means rigidly connecting the same to said shaft for a positive drive thereby, a foraminated annular spinner disposed coaxially of said shaft and macerator plate in peripheral surrounding relation to the latter to confine vegetable or like matter macerated by and centrifugally thrown from the plate, a member coaxial with said shaft having clutch means providing for a positive, one-way overrunning drive of said member from said shaft, and means connecting said spinner to said member for a corresponding positive and overrunning drive of the spinner from the shaft at a speed no less than that of the shaft, said clutch means enabling said member and spinner to unidirectionally overrun the shaft and macerator plate upon predetermined retardation of the rotation of said plate and shaft, said last named connecting means comprising mating annular frusto-conical surfaces on said member and spinner in a releasable frictional engagement with one another for the drive of the spinner from the member, yet permitting separation of said spinner from said member upon relative axial movement thereof, said surfaces being of a diameter greater than that of said macerator plate to permit said spinner to clear said macerator plate axially in separating.

27. A juicer provided with an upright rotatably driven shaft, a hub mounted on the shaft to rotate therewith, a cutter plate mounted upon the hub and releasably coupled therewith to rotate with the shaft, a cylindrical cup-shaped screw retainer secured to the cutter plate surrounding the shaft and overhanging the end of the shaft, a hold-down nut extending through the upper end of the screw retainer and threaded upon the upper end of the shaft within the screw retainer, said nut provided with an outwardly projecting flange within the screw retainer, a spinner coupled with the shaft for rotation thereby and surrounding the cutter plate to receive disintegrated material from the plate, and a collector basin surrounding the spinner to receive juice therefrom.

28. A juicer as defined in claim 23 characterized in that the bottom of the spinner is provided with a detent projecting downwardly which has a flat side wall portion and a sloping side wall portion and said spinner support is provided with a dog pivotally coupled thereto to rotate therewith, said spinner support having a cut-out extending therethrough and said dog having a part projecting upwardly through the cut-out and adapted to engage the flat side of the detent to drive the spinner or to ride over the sloping side of the detent to permit the spinner to overrun the spinner support.

29. A juicer as defined in claim 23 characterized in that said cooperating driving means comprises a part projecting downwardly from the bottom of the spinner having a flat side wall and a sloping side wall and the spinner support is provided with a swingably supported dog operable to be swung by centrifugal force of rotation of the support upwardly and outwardly to engage the cooperating part of the spinner to drive the same.

30. A juicer as defined in claim 23 characterized in that said cooperating driving means comprises a part projecting downwardly from the bottom of the spinner having a flat side wall and a sloping side wall and the spinner support is provided with a swingably supported dog operable to be swung by centrifugal force of rotation of the support upwardly and outwardly to engage the cooperating part of the spinner to drive the same, and the spinner support is provided with an opening through which the dog is swung to engage the spinner, and said opening has one wall provided with a bumper cushion to engage the dog.

References Cited in the file of this patent
UNITED STATES PATENTS

| | | |
|---|---|---|
| 651,706 | Forbes | June 12, 1900 |
| 2,255,764 | Drachenberg | Sept. 16, 1941 |
| 2,295,922 | Weston | Sept. 15, 1942 |
| 2,400,818 | Gallagher | May 21, 1946 |
| 2,870,653 | Koenig | Jan. 27, 1959 |